Nov. 19, 1957
H. BRIER
2,813,709
STRAIN GAUGE LOAD INDICATOR
Filed Jan. 6, 1954
2 Sheets-Sheet 1
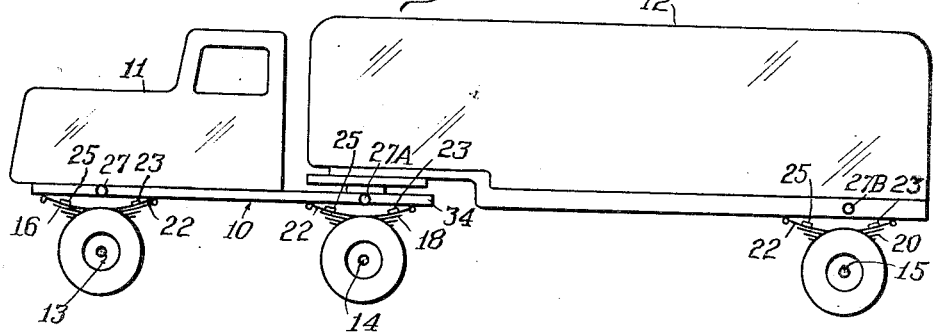
Fig. 1.
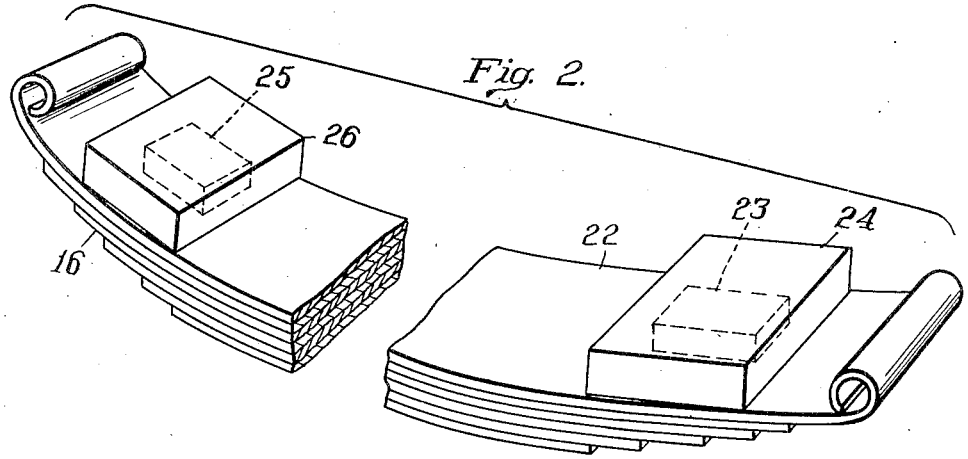
Fig. 2.
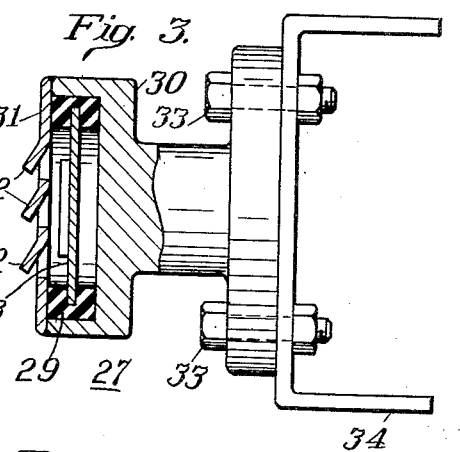
Fig. 3.
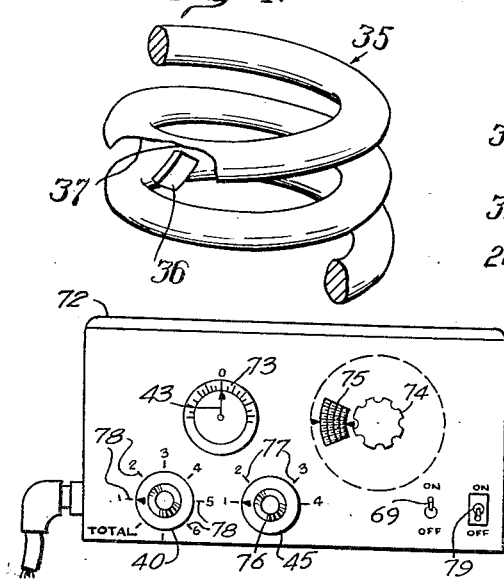
Fig. 4.
Fig. 5.
INVENTOR.
Hyman Brier
BY Toulmin & Toulmin
ATTORNEYS INVENTOR
Hyman Brier
BY
ATTORNEYS United States Patent Office 2,813,709
Patented Nov. 19, 1957

2,813,709

STRAIN GAUGE LOAD INDICATOR

Hyman Brier, Dayton, Ohio, assignor to The Commonwealth Engineering Company of Ohio, Dayton, Ohio, a corporation of Ohio Application January 6, 1954, Serial No. 402,549

3 Claims. (Cl. 265—42)

The present invention relates to an apparatus for determining axle loads on a vehicle, more particularly to the use of strain gauges on the springs of trucks and the like to indicate the individual and total loads on the axles of these vehicles.

As the size, weight, and capacity of trucks have been steadily increasing, it has become more necessary than ever before to quickly and accurately determine the total weight of a truck. Every state today has limits on the gross weight of trucks which can legally travel over its highways. These load limits are expressed either in terms of weight per axle or gross weight of the vehicle. Therefore truckers are constantly faced with the necessity of accurately determining the gross weight of their trucks in order to insure that these weights remain within the legal limits.

The conventional method of determining the weight of trucks or the like is by using a scale upon which the entire truck or a portion of the truck is driven. Consequently, the weights of trucks can be determined only at those locations which have the necessary weighing facilities. This invention discloses a simple and inexpensive system whereby the weight of a truck may be readily determined. Moreover, the apparatus for determining these weights can quickly and easily be installed on individual trucks so that the driver of a truck can, with a minimum of effort, determine the weight of his truck at any time.

This invention essentially comprises the use of resistance strain gauges on the suspension springs which support the truck body on the axles. Each resistance strain gauge is connected in a bridge circuit with an associated compensating gauge and a pair of standard resistors. By means of a suitable switch arrangement these bridge circuits may be selectively connected with a galvanometer, an electro-motive force, and a variable resistor. The variable resistor is calibrated in terms of load units. Consequently, when a bridge circuit is connected with the galvanometer circuit there will be a deflection of the galvanometer. By adjusting the variable resistor until the galvanometer reads "zero," it can be quickly determined from the calibrated scale on the resistor the load which is on the strain gauge. While this is the basic nature of the invention other circuit connections are illustrated and will be subsequently described, wherein the total weight of all the strain gauges collectively may be obtained with a single reading. As will be fully described later, the strain gauges mounted on the springs associated with a single axle may be connected together so that the total load on a particular axle may be obtained at one reading.

The controls for this invention, which comprise the galvanometer, potentiometer, and the selector switches are preferably assembled together in a single unit. This unit is mounted in the cab of the vehicle. With the controls of this invention so conveniently located, the operator of the vehicle can rapidly ascertain the load of his vehicle.

With the above general description of the invention in mind, it can be seen that this invention embodies a structure which is very simple in nature and can be inexpensively installed upon a vehicle. Furthermore, this system gives a rapid and accurate determination of the weight of a vehicle. By the universal installation of this system upon trucks, and the calibrating and sealing of the control units by the responsible state officials, it is at once apparent that lengthy stops to determine the weights of trucks on the highways can be eliminated. Expensive weighing stations with their attendant maintenance costs can be disposed of. The weighing officials merely would read the desired weights from the cab of the truck, and the truck would not be unduly delayed en route with its cargo.

It is pointed out that this invention is also applicable to buses and any other wheeled vehicles which are spring mounted.

Therefore it is a primary object of this invention to provide a system for quickly and accurately determining axle loads and the total load on a vehicle.

It is another object of this invention to provide a system for selectively determining the total load and the individual wheel or axle loads of a vehicle.

It is a further object of this invention to provide a load-indicating system having a strain gauge on each supporting spring and a circuit whereby either the individual wheel loads or the total load may be easily determined by suitably connecting the strain gauges.

It is an additional object of this invention to provide a load-indicating system utilizing resistance strain gauges on the springs of a vehicle.

It is still another object of this invention to provide a load-indicating system having as its basic component a bridge circuit which comprises a resistance strain gauge mounted on the spring of a vehicle and a compensating gauge mounted on a vehicle frame.

It is still a further object of this invention to provide a system for determining axle loads of a vehicle, which system has as the basic component thereof a resistance strain gauge and a compensating gauge connected in a bridge connection which is in series with a galvanometer and a potentiometer, the potentiometer being calibrated to give a load reading when the resistance through the bridge connection is balanced against the potentiometer.

Other objects and advantages of this invention will become readily apparent when taken in conjunction with the accompanying drawings, wherein:

Figure 1 is an elevational view of a truck showing the location of the resistance spring gauges on the springs and the compensating gauges on the frame of the truck;

Figure 2 is a perspective drawing of a leaf spring of the truck in Figure 1 with a center portion of the spring removed and showing in detail the manner in which the strain gauges are affixed on a spring;

Figure 3 is an end view of a beam forming the frame of the truck in Figure 1, showing the manner in which the compensating gauge is mounted on the frame, and, in addition, a portion of the mounting means for the compensating gauge is cut away to show in detail the manner whereby the compensating gauge is supported within the mounting means;

Figure 4 is a perspective drawing of a coil spring showing the manner in which a resistance strain gauge may be used in conjunction with a coil spring;

Figure 5 is a front elevational drawing of the control unit for the invention showing a proposed arrangement for the various control elements.

Figure 6:
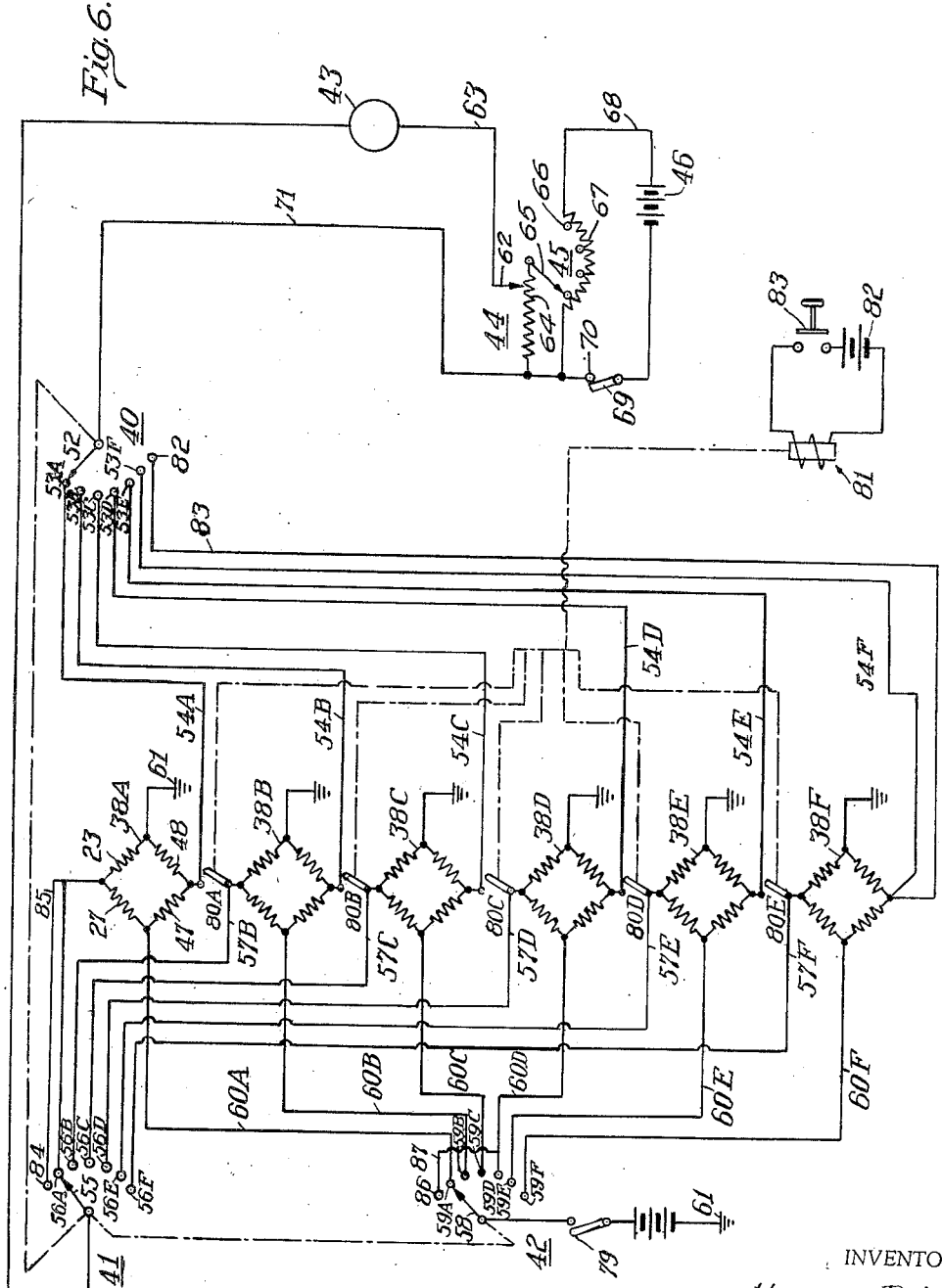
Figure 6 is a circuit diagram of this invention wherein it is possible to read the total load of a vehicle by using the same strain gauges used for indicating the individual spring loads.

Returning now to the drawings, more particularly to Figure 1, wherein like reference characcters indicate the same parts throughout the various views, 10 indicates generally a truck upon which the invention is installed. The truck 10 is of the articulated type, i. e. it comprises a tractor 11 and a trailer 12. The tractor 11 has a front axle 13 and a rear axle 14. The trailer 12 has a single axle 15. A set of leaf springs 16 and 17 (not shown) support the tractor 11 above the front axle 13. The rear end of the tractor 11 is supported above the rear axle 14 by means of a set of leaf springs 18 and 19 (not shown). The trailer 12 is supported above the trailer axle 15 by a pair of leaf springs 20 and 21 (not shown). The leaf springs 16 through 21 are respectively attached to the tractor and trailer bodies and to the associated axles in the conventional manner.

Turning now to Figure 2 there is disclosed therein an enlarged drawing of the leaf spring 16. It will be understood that each of the remaining leaf springs 17 through 21 are similar in appearance to the leaf spring 16. Consequently, only the leaf spring 16 will be discussed in detail. On the upper leaf 22 of the leaf spring 16 there is mounted a conventional resistance strain gauge 23. Strain gauge 23 is mounted on the upper leaf 22 by suitably bonding the strain gauge thereto. A metal shield 24 protects the strain gauge from the elements and dirt. On the other end of the upper leaf 22 of the leaf spring 16 there is mounted an auxiliary resistance strain gauge 25. The auxiliary gauge 25 is also protected by a metal shield 26.

It is noted that the strain gauges are mounted on the upper leaves of the leaf spring 16. It should be borne in mind, however, that the strain gauges may be satisfactorily mounted on the bottom leaf of the leaf spring 16. However, it is pointed out that by mounting the strain gauges on the upper leaves of the leaf springs the strain gauges are better protected against damage.

In Figure 3 there is indicated generally as 27 a compensating gauge structure. The locations of the compensating gauges 27 are more clearly illustrated in Figure 1. The compensating gauge 27 essentially comprises a spring steel disc 28. The disc 28 is responsive to temperature changes, and the responses of the disc 28 are correlated in the circuit in a manner to be described later. The disc 28 is resiliently mounted in a rubber ring 29. The rubber ring 29 is secured within a housing 30. A cover plate 31 having louvers 32 therein protects the disc 28 but permits the disc to be exposed to the surrounding atmosphere. The housing 30 is secured by means of bolts 33 to the channel member 34, which is a component of the frame of the tractor 11.

It is pointed out that the resistance gauges of this invention are not limited to mounting upon leaf springs as illusrated in Figure 2. In Figure 4 there is illustrated a coil spring 35 which has a resistance strain gauge 36 bonded thereto. A portion 37 of the coil spring has been cut away in order to clearly illustrate the strain gauge 36 as affixed in position.

Proceeding now to Figure 6, there is illustrated therein a circuit whereby the load upon any individual spring or the total load on all the springs may be readily ascertained. The circuit illustrated in Figure 6 is particularly adapted for operation with the load-indicating system as installed in the truck 10 illustrated in Figure 1. The circuit basically comprises a number of bridge circuits 38A through 38F. Through the use of a number of selector switches 40, 41, and 42, any of the aforementioned bridge circuits may be selectively placed in circuit with a galvanometer 43, a potentiometer 44, a range switch 45, and a voltage source 46. The circuit as disclosed in Figure 6 shows the bridge circuit 38A to be connected in circuit. The circuit will be traced and described as it is illustrated in Figure 6, but it is to be understood that by connecting correspondingly numbered parts of the circuit in a manner to be later described, any of the bridge circuts may be connected in circuit.

Returning now to the bridge circuit 38A, this bridge circuit 38A comprises the resistance strain gauge 23, the associated compensating gauge 27 connected in a bridge with a pair of standard fixed resistors 47 and 48. Each of the bridge connections 38B through 38F similarly comprises a resistance strain gauge, a compensating gauge and a pair of standard fixed resistors.

The selector switch 40 is manually operated and serves to determine which of the bridge circuits will be connected in circuit. As indicated in Figure 6, it can be seen that the selector switches 41 and 42 are mechanically connected to the selector switch 40. The selector switch 40 comprises a movable contact arm 52 and a plurality of fixed contacts 53A through 53F. The contact 53A is connected to one side of the bridge 38A by the lead 54A.

The selector switch 41 comprises a movable contact arm 55 and a plurality of fixed contacts 56A through 56F. The fixed contact 56A is connected to the other side of the bridge circuit 38A by means of the lead 57A.

The selector switch 42 is used to ground the bridge circuits. This selector switch 42 comprises a movable contact arm 58 and a plurality of fixed contacts 59A through 59F.

It is pointed out that each of the bridge circuits 38A through 38F and 39 has two ground connections. Turning to the bridge connection 38A, it will be noticed that one side of the bridge is permanently grounded at the point 61. Each of the remaining bridges has a similar permanent ground, as indicated at 61. The side of the bridge circuit opposite the permanent ground connection is connected by means of a lead 60A to the contact 59A which is located on the selector switch 42. Consequently, it can be seen that when the bridge circuit 38A is in series with the galvanometer to give a reading as indicated in Figure 6 the bridge circuit 38A is at the same time fully grounded. Correspondingly indicated leads 60 connect the remaining bridge circuits with the selector switch 42.

It is necessary that both sides of any bridge which is being read be grounded because of the ever-present possibility that a charge of static electricity would build up on the truck 10 when the truck is traveling on the highway. This static charge in turn would affect the accuracy of the readings of the various bridges. Consequently, in order to properly ground each bridge circuit when a reading is being made therefrom, the selector switch 42 will be automatically connected to a side of the bridge circuit which is connected in circuit with the galvonometer 43. This result occurs because, as pointed out above, the selector switches 41 and 42 are mechanically connected to the selector switch 40, which is mounted on the control panel.

Returning now to the control elements of the circuit, the galvanometer 43 is connected in series to a movable arm 62 on the potentiometer 44 by means of a lead 63. The potentiometer 44 comprises a resistance 64 which has one end connected with the range switch 45. The range switch 45 comprises a movable contact arm 65 which co-operates with a number of fixed contacts 66 which are spaced along a resistance element 67. The movable arm 65 of the range switch is connected to one side of the resistance 64. One side of the resistance element 67 of the range switch 45 is connected to the voltage source 46 by means of a lead 68. If so desired, a manually-operated switch 69 may be connected to the other side of the voltage source 46. Fixed contact 70 of the switch 69 is then connected to the movable arm 52 of the selector switch 40 by means of a lead 71. The contact 70 is also connected to one end of the resistance 64 and one end of the resistance 67.

Returning now to Figure 5, there is illustrated therein a control panel 72 in which the control elements of this invention are mounted. The galvanometer 43 is provided with a deflection scale 73. As the mode of operation of this invention comprises balancing the galvonometer against the external resistance in the circuit, it is only necessary that a zero deflection point be noted on the scale 73. The potentiometer 44 has a rotatable handle 74. The potentiometer 44 has a plurality of calibrated scales 75 affixed to the handle 74. The plurality of the scales 75 corresponds with the plurality of the positions on the range switch 45. The scales 75 are so calibrated that the readings thereon when the galvanometer is at zero deflection with a certain external resistance in the galvanometer circuit will give the load on the strain gauge associated with that particular bridge circuit. The operation in detail of this invention will be discussed later.

The selector switch 45 located in the control panel 72 has a rotatable handle 76. Four positions 77 are indicated about the periphery of the handle 76. As the total load which can be indicated by this invention will vary from the load on one wheel to the total load on all the wheels, it can be seen that this system must operate over a wide range of resistances. Consequently, by selecting the correct position with the selector switch 45, it is possible to insure that the deflection of the galvanometer 43 will fall within the scale 73. When this rough adjustment has been made, a finer adjustment is then made with the potentiometer 44.

The selector switch 40 is also mounted on the control panel 72. This switch 40 also has a plurality of positions 78 about the periphery of the switch. It can be seen that these positions are seven in number and correspond to each one of the individual springs on the truck 10, and also the total position whereby the total load on the auxiliary resistance strain gauges 25 may be ascertained.

Also mounted on the control panel 72 is the switch 69 which energizes the circuit, and the switch 79 which connects the movable contact arm of the selector switch 42 with ground.

With the structure of this invention now in mind, the function of this invention will be described by illustrating an example of the process employed in determining a load.

Returning now to Figure 6, it is seen that the circuit disclosed therein is connected with the bridge circuit 38A in circuit with the galvanometer 43. With this connection, a reading may be obtained of the load on the leaf spring 16. The load on the spring 16 will cause the resistance strain gauge 23 mounted thereon to be strained an amount proportionate to the load imposed upon the leaf spring 16. This strain upon the gauge 23 will in turn vary the resistance across the gauge. This change in resistance from the resistor 23 will result in a variation of the total impedance across the bridge connection 38A. This total impedance will also be affected by the action of the compensating gauge 27. This compensating gauge 27 is so calibrated that the total impedance across the bridge circuit 38A is constant for a particular weight upon the strain gauge 23 regardless of the temperature of the surrounding atmosphere.

This variation of the impedance across the bridge circuit 38A will in turn result in a variation of the current flowing to the galvanometer 43. This change in current will cause a deflection of the galvanometer from the zero point. The range switch 45 is then adjusted to the correct position in order to insure that the deflection of the needle of the galvanometer 43 remains within the scale 73. When this adjustment has been made, the potentiometer 44 is then carefully adjusted to bring the pointer of the galvanometer 43 to the zero point on the scale. With the galvanometer reading zero, the load on the leaf spring 16 is then read directly from the appropriate scale 75 on the potentiometer 44.

By adjusting the selector switch 40 to each one of the contacts 53A through 53F, the same process is followed to obtain the load reading on each one of the individual leaf springs 16 through 21.

With this circuit as shown in Figure 6 it is possible to obtain the total load reading on the leaf springs without the use of auxiliary resistance strain gauges on the leaf springs. The same strain gauge may be used to give either the individual load on that particular spring or may be connected in series with each of the other strain gauges in order to give the total load on all the springs. A plurality of switches 80A through 80E, which are simultaneously actuated by a relay 81, are placed in the circuit in a manner to be fully described. The relay 81 has in circuit therewith a voltage source 82 and a manually-operated switch 83. The relay 81 is mechanically connected to each one of the switches 80A through 80E in such a manner that when the switches 80A through 80E are open, actuation of the relay will cause the switches to close, and when the switches 80A through 80E are closed, actuation of the relay will result in the switches being open.

The switch 80A is interposed between the bridge circuits 38A and 38B in such a manner that when the switch 80A is closed the bridge circuits are connected in series with each other. The remaining switches 80B through 80E are likewise interposed between the remaining bridge circuits in the manner illustrated in Figure 6. Consequently, when all of the switches 80A through 80E are closed, the bridge circuits 38A through 38F are serially connected with each other.

There is placed in selector switch 40 a contact 82. This contact is connected by means of a lead 83 to the bridge circuit 38F.

The selector switch 41 has the fixed contact 84. The contact 84 is connected by means of a lead 85 to the bridge circuit 38A in the manner shown in Figure 6.

In the selector switch 42 a fixed contact 86 is located. The contact 86 is connected by means of a lead 87 to the lead 60D. Consequently, when the movable arm 58 of the selector switch 42 is in contact with the fixed contact 86 the serially connected bridge circuits 38A through 38F are grounded.

To determine the total load on the leaf springs of the truck, the manually-operated switch 83 is pushed so that the relay 81 is actuated. This causes the switches 80A through 80E to close and the bridge circuits 38A through 38F are serially connected. The selector switch 40 is then moved so that the movable arm 52 is in contact with the fixed contact 82. As the selector switches 41 and 42 are mechanically connected to the selector switch 40, the respective movable arms of selector switches 41 and 42 will be connected to the fixed contacts 84 and 86 respectively. With this connection it can be seen that a reading is being obtained of the total impedances of the bridge circuits 38A through 38F. This load reading is obtained in a manner similar to that described in connection with the determination of a load across an individual bridge circuit.

While this is not illustrated in the drawings, it is pointed out that the strain gauges associated with a particular axle may be connected together. In this manner it would be possible to obtain the total load on an axle. In fact, the resistance strain gauges may be connected together in any manner desired to obtain the desired load indication.

Thus it can be seen that this invention provides a simplified system for determining loads on an individual spring or the total load of a vehicle. Although this invention has been described as being installed on a trailer truck, it is at once apparent that the invention may be installed on an integral truck, bus, or any other type of wheel vehicle. In addition this invention may also be satisfactorily employed on railroad cars and on the landing gear of aircraft. To get accurate results it is preferable that the strain gauges be mounted on springs—either the leaf or coil type, but the strain gauges may also be mounted upon any other member of the vehicle which is strained proportionate to the load imposed thereon, or the load which it is desired to be determined.

It will be understood that other modifications and arrangements in structure could be made without departing from the spirit of my invention, and accordingly it is desired to comprehend such modifications and substitutions of equivalents as may be considered to come within the scope of the appended claims.

What is claimed as this invention is:

1. In a vehicle having a plurality of axles and a body; leaf spring means attached to each of said axles for supporting said vehicle body on said axles; a resistance strain gauge mounted on each of said leaf spring means; a compensating gauge member mounted on the frame of the vehicle in the vicinity of each leaf spring means; a plurality of bridge circuits with each said circuit comprising one of said resistance strain gauges and one of said compensating gauge members; a plurality of switches to connect said bridge circuits in series with each other; relay means to simultaneously actuate all of said switches; and control means comprising a galvanometer, means to selectively connect any one of said bridge circuits or all of said bridge circuits collectively in series with said galvanometer, and calibrated means to give the load reading associated with the bridge circuit or circuits connected with the galvanometer.

2. In a vehicle having a plurality of axles and a body; coil spring means attached to each of said axles for supporting said vehicle body on said axles; a resistance strain gauge mounted on each of said coil spring means; a compensating gauge member mounted on the frame of the vehicle in the vicinity of each coil spring means; a plurality of bridge circuits with each said circuit comprising one of said resistance strain gauges and one of said compensating gauge members; a plurality of switches to connect said bridge circuits in series with each other; relay means to simultaneously actuate all of said switches; and control means comprising a galvanometer, means to selectively connect any one of said bridge circuits or all of said bridge circuits collectively in series with said galvanometer, and calibrated means to give the load reading associated with the bridge circuit or circuits connected with the galvanometer.

3. In a vehicle having a plurality of axles and a body; spring means attached to each end of each axle for resiliently supporting said vehicle body on said axles; a resistance strain gauge mounted on each of said spring means; means for compensating said resistance strain gauges against temperature changes; a plurality of bridge circuits with each said circuit comprising one of said resistance strain gauges and one of said temperature compensating means; means to selectively connect said bridge circuits in series; relay means to simultaneously actuate all of said last mentioned means to connect said bridge circuits in series; and control means comprising a galvanometer, means to selectively connect any one of said bridge circuits or all of said circuits collectively in series with said galvanometer, and calibrated means to give the load reading associated with the bridge circuit or circuits connected with the galvanometer.

References Cited in the file of this patent

UNITED STATES PATENTS

| | | |
|---|---|---|
| Re. 14,475 | Troll | May 21, 1918 |
| 825,839 | James | July 10, 1906 |
| 1,407,078 | Murray | Feb. 21, 1922 |
| 1,491,081 | Cook et al. | Apr. 22, 1924 |
| 1,787,884 | Walsh | Jan. 6, 1931 |
| 2,316,203 | Simmons | Apr. 13, 1943 |
| 2,392,293 | Ruge | Jan. 1, 1946 |
| 2,423,867 | Zener et al. | July 15, 1947 |
| 2,443,045 | Magruder et al. | June 8, 1948 |
| 2,453,607 | Wardle et al. | Nov. 9, 1948 |
| 2,509,621 | Willoughby | May 30, 1950 |
| 2,582,886 | Ruge | Jan. 15, 1952 |
| 2,597,751 | Ruge | May 20, 1952 |
| 2,625,822 | Nichols | Jan. 20, 1953 |
| 2,630,007 | Howe et al. | Mar. 3, 1953 |
| 2,759,356 | Blackmon et al. | Aug. 21, 1956 |

FOREIGN PATENTS

| | | |
|---|---|---|
| 468,718 | Canada | Oct. 10, 1950 |